United States Patent
Livingston et al.

(10) Patent No.: US 10,684,663 B2
(45) Date of Patent: Jun. 16, 2020

(54) ACCURATE VOLTAGE CONTROL TO ENHANCE POWER PERFORMANCE OF CIRCUITS

(71) Applicant: Intel Corporation, Santa Clara, CA (US)

(72) Inventors: Kelly Livingston, Beaverton, OR (US); Federico Ardanaz, Hillsboro, OR (US); Dmitry Lukianchenko, Beaverton, OR (US); Fuat Keceli, Portland, OR (US); Jonathan Eastep, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 15/856,154

(22) Filed: Dec. 28, 2017

(65) Prior Publication Data

US 2019/0041930 A1 Feb. 7, 2019

(51) Int. Cl.
*G06F 1/00* (2006.01)
*G06F 1/26* (2006.01)

(52) U.S. Cl.
CPC ..................... *G06F 1/26* (2013.01)

(58) Field of Classification Search
CPC ....................................................... G06F 1/26
See application file for complete search history.

(56) References Cited

U.S. PATENT DOCUMENTS

| | | |
|---|---|---|
| 6,636,976 B1 | 10/2003 | Grochowski et al. |
| 9,037,883 B2 | 5/2015 | Huang et al. |
| 2009/0300329 A1 | 12/2009 | Naffziger et al. |
| 2016/0132084 A1 | 5/2016 | Solki et al. |
| 2016/0370837 A1 | 12/2016 | Shi et al. |

OTHER PUBLICATIONS

Fuat Keceli et al., U.S. Appl. No. 15/858,030, entitled "Voltage Droop Mitigation Technology in Array Processor Cores", filed Dec. 29, 2017, 37 pages.
International Search Report and Written Opinion for International Patent Application No. PCT/US2018/058910, dated Feb. 19, 2019, 10 pages.

*Primary Examiner* — Xuxing Chen
(74) *Attorney, Agent, or Firm* — Jordan IP Law, LLC (57) ABSTRACT

Systems, apparatuses and methods may provide for receiving indicator data associated with activity of a load. Additionally, an estimation of a rate of change of a current of the load with respect to time may be determined from the indicator data. Moreover, a boost signal may be selectively output to a voltage regulator when the estimation of the rate of change is greater than a first amount. The boost signal may be associated with an adjustment in an output voltage of the voltage regulator and the output voltage may be provided to the load.

21 Claims, 6 Drawing Sheets

ACCURATE VOLTAGE CONTROL TO ENHANCE POWER PERFORMANCE OF CIRCUITS

TECHNICAL FIELD

Embodiments generally relate to power management in a computer architecture. More particularly, embodiments relate to accurate power estimations of an electrical load (e.g., a baseline circuit), and power control to improve performance in the computer system.

BACKGROUND

A load (e.g., an electrical circuit) may execute a series of workloads. Power requirements may fluctuate depending on the variations in workloads. A significant power ramp increase may cause a voltage output, provided from a power deliverer to the load, to drop. To reduce the possibility of the voltage input dropping below a minimum threshold, system power may be enforced by actively controlling the voltage provided to the load. Conventional technologies may be designed for systems that rarely suffer from significant power ramp increases. As such, conventional technologies may rely on conservative guard bands that waste power and use inefficient mechanisms for reducing power (e.g., throttling) to reduce the power ramp. Such conventional technologies may substantially degrade job performance and waste power.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
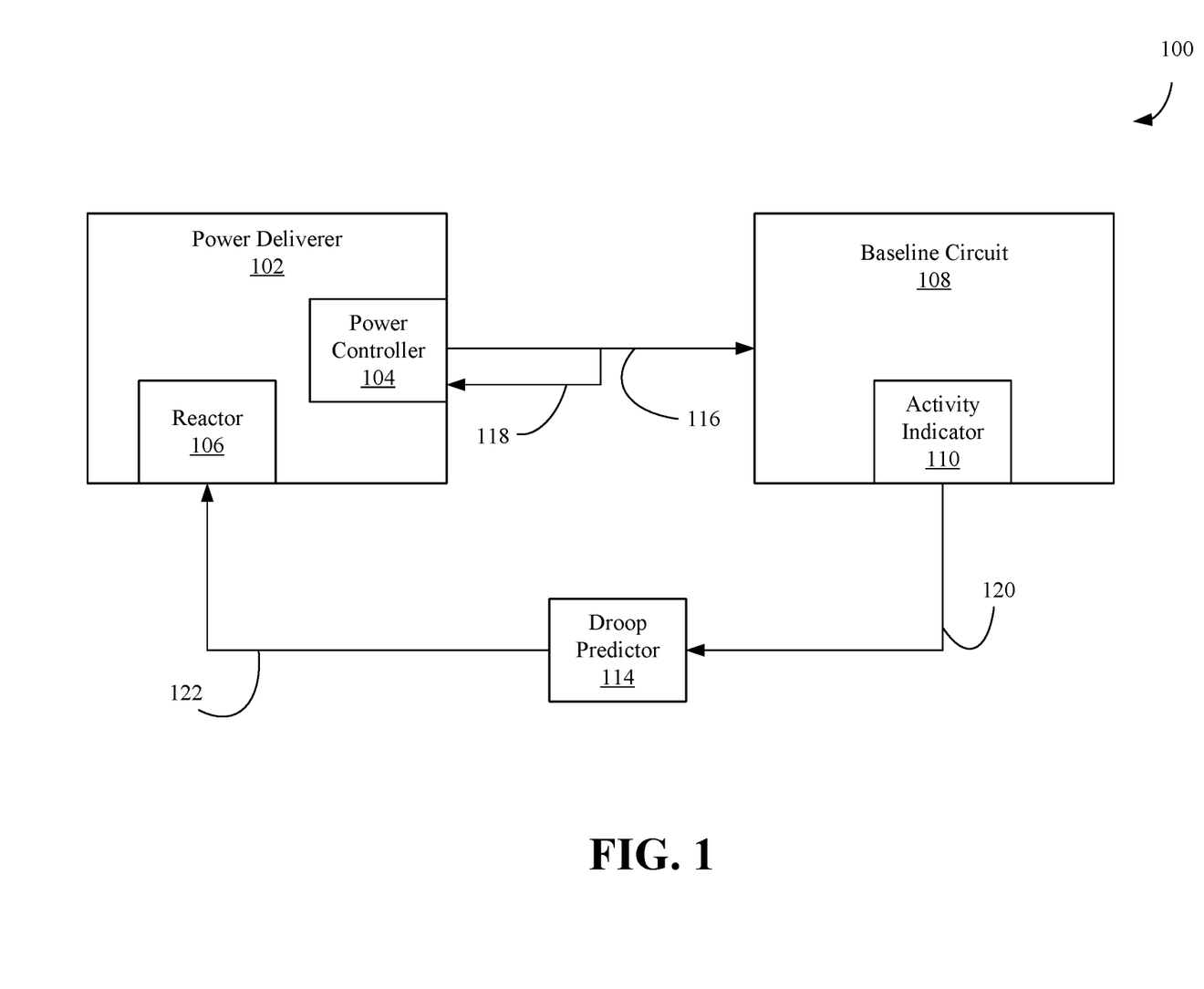
FIG. 1 is a block diagram of an example of a computing architecture according to an embodiment.

Turning now to FIG. 1, a computing architecture 100 (e.g., a system-on-chip) is shown in which a power deliverer 102 (e.g., a voltage regulator) provides power 116 to a baseline circuit 108. An activity indicator 110 provides indicator data 120 to a droop predictor 114. The baseline circuit 108 may be a processor, microprocessor, field-programmable gate array system, data flow architecture, systolic array design or any circuit which consumes power to operate. Further, the baseline circuit 108 may be a synchronous circuit. The power deliverer 102 may be capable of dynamically adjusting a voltage output of the power deliverer 102. For example, voltage and current components of the power 116 may be adjusted depending upon demands by the baseline circuit 108. The voltage component of power 116 may be referred to as output voltage.

The power consumed by the baseline circuit 108 may fluctuate depending on a number of factors (e.g., workload, architecture, temperature, etc.). The power deliverer 102 may include a closed-loop control mechanism that continuously tracks a target output voltage $V_{cc}$ through sensing signal 118 and corrects for observed power deviations. Such a tracking mechanism however may not respond quickly enough to completely correct voltage deviations when exposed to very sudden consumption spikes of baseline circuit 108, which may degrade performance (e.g., clock modulations or pipeline throttling), and result in a voltage droop. A voltage droop may be caused by an increase in the power demand (e.g., current demand) by the baseline circuit 108 and may be a sudden drop in the voltage output. To reduce the possibility of the output voltage reducing to an undesirable value (e.g., minimum voltage/$V_{min}$) during a voltage droop, guard banding may be utilized. Guard banding may constrain the output voltage to be set to a magnitude in which a maximum possible voltage droop will not drop the output voltage to be below $V_{min}$. Static guard banding may be inefficient since the output voltage may need to be set to a higher value than what is typically needed by the baseline circuit 108. Therefore, to enhance performance and power usage, the droop predictor 114 may predict a droop and dynamically change the guard band in response to the prediction rather than relying upon static guard bands.

For example, a rate of change of current with respect to time, which may be a $$\frac{di}{dt}$$

design characteristic, may be used to approximate a power consumption change by the baseline circuit 108. The rate of change of the current with respect to time may be known as the instantaneous rate of change of the current and may be a derivative of the current with respect to time. The rate of change of current with respect to time may be referred to as the rate of change of current $$\left(\text{e.g., }\frac{di}{dt}\right)$$

or current derivative. The current derivative may be estimated, and may be utilized by the droop predictor 114 to predict the voltage droop. When the droop predictor 114 predicts the voltage droop, the droop predictor 114 may output a boost signal 122 to temporarily increase power output by the power deliverer 102, and/or the output voltage. Therefore, the power deliverer 102 may implement a dynamic guard band that is adjusted based upon an output of the droop predictor 114.

The baseline circuit 108 may be a digital synchronous circuit that is capable of collecting run-time telemetry of internal activity of the baseline circuit 108 through activity indicator 110. In particular, the activity indicator 110 may collect various forms of telemetry data depending on a type of the baseline circuit 108, and output indicator data corresponding to current usage of the baseline circuit 108. For example, if the baseline circuit 108 is an instruction-based microprocessor, the activity indicator 110 may collect a number of instructions being decoded and/or a type of such instructions, and output the indicator data 120 based upon the collected number of instructions and/or the type of the instructions. Thus, the indicator data 120 may include a unitless value which corresponds to the collected number of instructions and/or the type of the instructions. If the baseline circuit 108 is a field programmable gate array system, the activity indicator 110 may collect data derived from used gates and input toggle rate, and output the indicator data 120 to include a unitless value based upon the collected data. If the baseline circuit 108 is a dataflow architecture or systolic array design, the activity indicator 110 may collect data derived from a number of triggered operations on a given cycle or a number of memory requests produced, and output the indicator data 120 to include a unitless value based upon the collected data. The indicator data 120 may be a signal, and may also be speculative or nearly exactly tracking the activity of the baseline circuit 108.

Therefore, the activity indicator 110 may output indicator data 120 which corresponds to activity (e.g., current usage) of the baseline circuit 108. The indicator data 120 may correspond to future current and/or power consumption of the baseline circuit 108 and in particular be associated with the estimation of the current. For example, the activity indicator 110 may determine an estimation of average current of a small fixed time which may be an operation over multiple clock cycles or a single cycle of a synchronous circuit. The activity indicator 110 may output the estimation as the indicator data 120. In some embodiments, the indicator data 120 may be an immediate report of current activity of the baseline circuit 108. If the estimation is an immediate report of activity, the estimation may be determined over a same clock cycle similar to as described above.

The droop predictor 114 may derive the estimation of the current derivative of the baseline circuit's 108 current (i.e., the current derivative value) based upon the indicator data 120. The estimation of the current derivative may correlate to power consumption of the baseline circuit 108. The estimation of the current derivative may be a digital estimation of activity, as opposed to a measured current or a measured voltage, although some embodiments may still consider the measured current or voltage.

The droop predictor 114 may adjust the power 116 of the power deliverer 102 based upon the estimation of the current derivative. For example, the droop predictor 114 may determine whether the estimation of the current derivative is greater than a first amount. If so, the boost signal 122 may be output to the reactor 106. The boost signal 122 may provoke the power deliverer 102 to increase the output voltage.

By reacting ahead of an actual voltage droop, and proactively injecting more current using the power deliverer 102, a reduced reliance of static voltage guard bands may be established to enhance power and performance efficiency of the computing architecture 100. That is, by injecting more current prior to a voltage droop occurring and based upon the estimated current derivative, the computing architecture 100 may temporarily increase power consumption, but may eliminate and/or reduce a need for clock modulations or pipeline throttling, hence avoiding performance degradation, and possibly avoid static guard banding altogether. The injected current may replenish the charge of the passive elements (e.g., capacitors and inductors) that maintain the output voltage. Further, the estimation of the current derivative may be predictive, rather than measured concurrently with the activity that is sent to activity indicator 110.

The droop predictor 114 may model the power deliverer 102 droop response and may be frequency invariant. For example, the droop predictor 114 may operate at a frequency different from the power deliverer 102. The droop predictor 114 may adjust estimations (e.g., windows of estimations) of the current derivative based upon the frequency and/or architecture of the power deliverer 102 to enhance accuracy and maintain consistency with the power deliverer 102. For example, the frequency of the power deliverer 102 may be modeled by the droop predictor 114 to determine the estimation of the current derivative.

Therefore, the droop predictor 114 may not need to wait to measure a high current or a voltage drop to prior to increasing the power 116, rather the droop predictor 114 may predict a high current or voltage drop and increase power 116 prior to the high current or voltage drop occurring. Thus, the droop predictor 114 may operate in a digital domain, but effect change in an analogue domain of the power deliverer 102.

The power deliverer 102 may include the reactor 106, which may be a voltage boosting specific interface. The reactor 106 may be control logic of the power deliverer 102. While the boost signal 122 is asserted, the reactor 106 may instruct a power controller 104 to increase an injection of current and/or voltage through linear or non-linear logic as quickly as possible. Therefore, the reactor 106 may be a dedicated interface that operates with the droop predictor 114. In response to the boost signal 122, the reactor 106 may interface directly with the power controller 104 to temporarily increase the dynamic voltage guard band of the power deliverer 102.

The magnitude of voltage deviations of the power 116 may depend on several factors. For example, a voltage droop may depend upon the baseline circuit's 108 power dynamic range and the time to transition between a low power state to a maximum power consumption state by baseline circuit 108, and vice-versa.

The droop predictor 114, the reactor 106, the power controller 104 and the activity indicator 110 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations described above may be written in any combination of one or more programming languages, including an object oriented programming language such as JAVA, SMALLTALK, C++ or the like and conventional procedural programming languages, such as the "C" programming language or similar programming languages.

Figure 2:
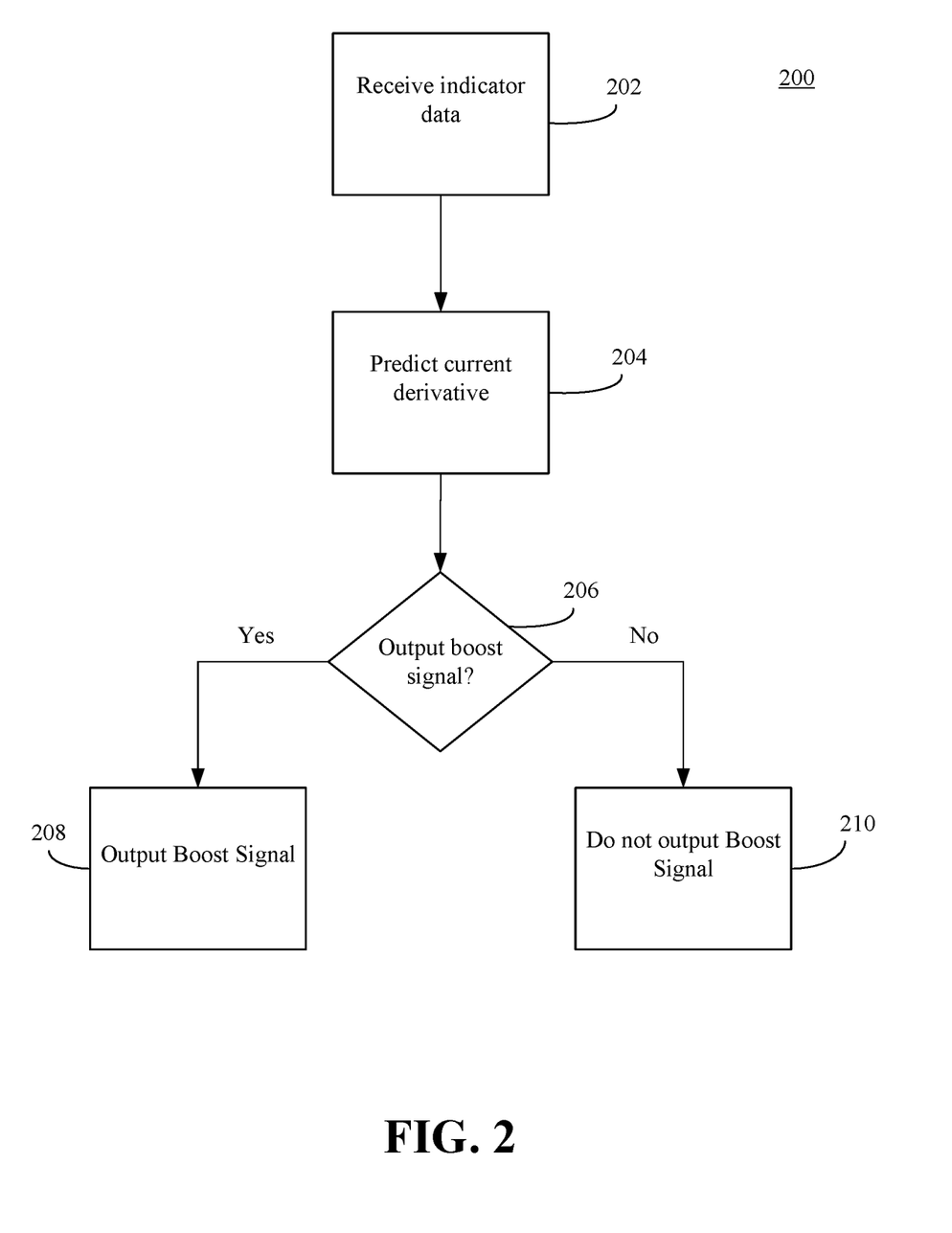
FIG. 2 is a flowchart of an example of a method of operating a power estimation control apparatus according to an embodiment.

FIG. 2 shows a method 200 of operating a power estimation control apparatus. The method 200 may generally be implemented by the computing architecture 100 (FIG. 1), already discussed. More particularly, the method 200 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. For example, computer program code to carry out operations shown in the method 200 may be written in any combination of one or more programming languages, including an object oriented programming language such as JAVA, SMALL- TALK, C++ or the like and conventional procedural programming languages, such as the "C" programming language or similar programming languages.

Illustrated processing block 202 may receive indicator data. The indicator data may correspond to activity of a baseline circuit. Illustrated processing block 204 may predict a current derivative based upon the indicator data. Illustrated processing block 206 may determine whether to output a boost signal based upon the predicted current derivative. The boost signal may temporarily increase a voltage output of a power deliverer, for example a voltage regulator. For example, if the predicted current derivative is greater than a first amount, the boost signal may be determined to be output. If the boost signal is determined to be output, illustrated processing block 208 may output the boost signal. Otherwise, illustrated processing block 210 may suppress providing the boost signal.

Figure 3:
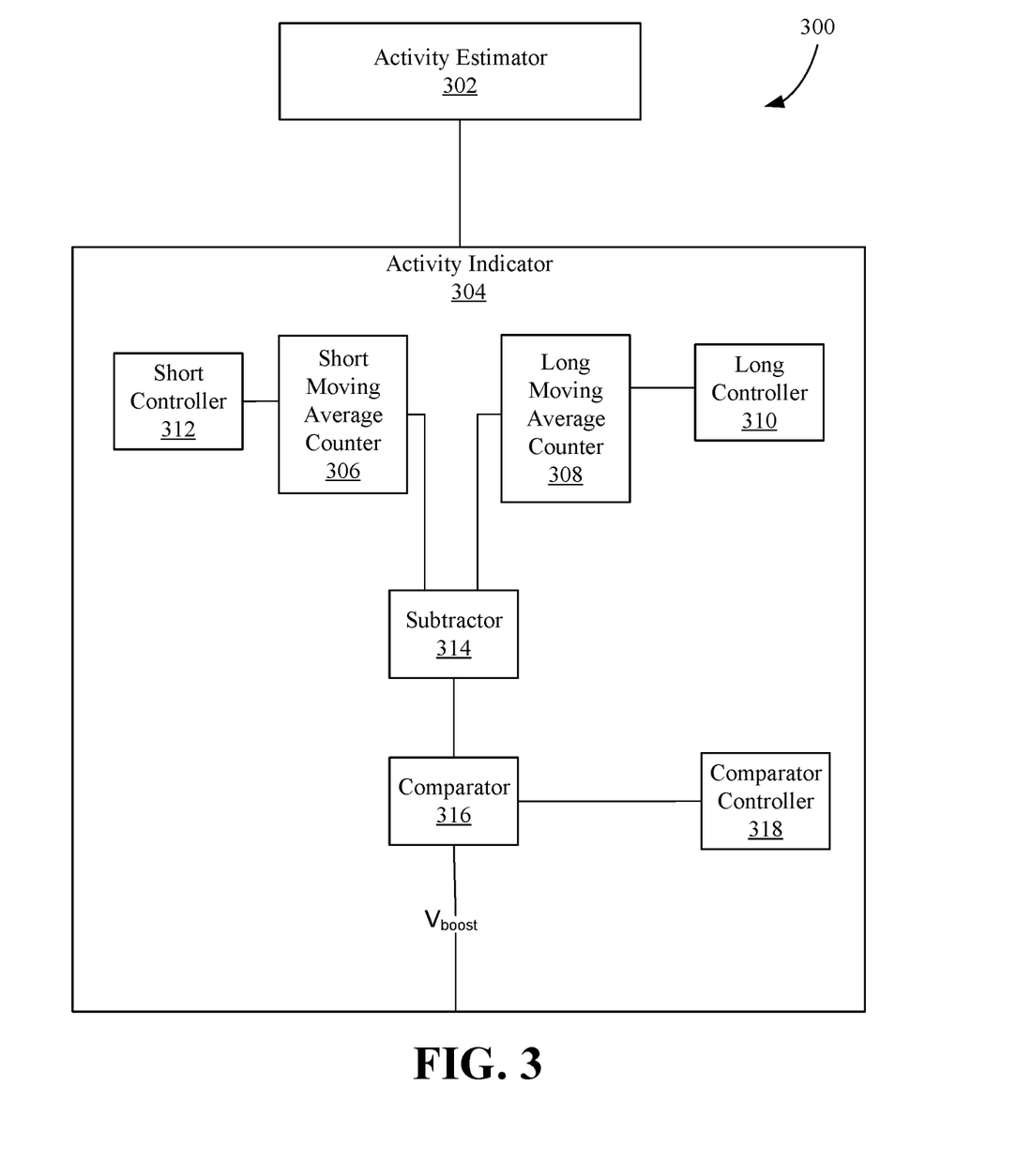
FIGS. 3-4 are block diagrams of examples of contention systems according to an embodiment.

FIG. 3 illustrates a current derivative contention system 300. The current derivative contention system 300 includes an activity estimator 302 and activity indicator 304. The activity estimator 302 and activity indicator 304 may implement aspects of the activity indicator 110 and droop predictor 114. The current derivative contention system 300 may selectively output a boost signal (e.g., $V_{boost}$) to a power deliverer when an estimated current derivative is greater than a first amount.

The activity estimator 302 may estimate activity of a baseline circuit. As described above, the estimation may be based upon a specific architecture of the baseline circuit, and may be determined in several ways. The activity estimator 302 may provide the indicator data to the activity indicator 304 as a digital estimation of activity, which corresponds to current usage of the baseline circuit. The indicator data may correspond to the activity estimation, and in particular to a level of activity of the baseline circuit.

In order to estimate a gradient of change in current, the indicator data may be fed simultaneously into two moving average counters 306, 308. These two moving average counters 306, 308 may operate in a similar manner to calculate averages of the activity, but over different periods of time. In particular, the short moving average counter 306 may determine an average of activity of the baseline circuit over a shorter time period (e.g., a previous few cycles). The long moving average counter 308 may determine the average activity of the baseline circuit for a longer period (e.g., several hundred clock cycles). The short and long time periods may be adjusted based upon architectures of the baseline circuit and the power deliverer providing power to the baseline circuit to remain in synchronization with the clock cycles of the power deliverer as well as a reaction time of the power deliverer. The reaction time may be related to a Unity Gain Bandwidth of the power deliverer, for example when the power deliverer is a voltage regulator. The time periods may be adjusted by the short and long controllers 310, 312 to maintain synchronization, and may be tunable factors.

The output (e.g., moving averages) of the short and long moving average counters 306, 308 may be subtracted from each other by the subtractor 314. For example, a long moving average of the long moving average counter 308 may be subtracted from a short moving average of the short moving average counter 306. The difference between the short and long moving averages may approximate the current derivative. The output of the subtractor 314 may be provided to a comparator 316.

The difference between the long and short moving averages may be compared to a threshold value by the comparator 316. The determination by the comparator 316 may correspond to several aspects of the baseline circuit. For example, the determination may indicate whether the baseline circuit is in a steady-state scenario. That is, both moving averages of the short moving average counter 306 and long moving average counter 308 may have the same or very similar outputs during a steady state. In contrast, the long and short moving averages may differ considerably during rapidly increasing or decreasing levels of activity and hence indicate that the baseline circuit is not in a steady state. Therefore, if the comparator 316 determines that the difference between the long and short moving averages is larger than or equal to the threshold value, the baseline circuit may not be in a steady state. If, however, the comparison of the comparator 316 indicates that the difference between the long and short moving averages is less than the threshold value, the baseline circuit may be in a steady state.

An output of the comparator 316 may be output as the boost signal $V_{boost}$ to the power deliverer. When the difference between the long and short moving averages is larger than or equal to the threshold value, the output of the comparator 316 (i.e., boost signal $V_{boost}$) may be set to "high" and the power deliverer may increase the voltage output of the power deliverer. In contrast, if the difference is less than the threshold value, the boost signal $V_{boost}$ may be set to "low" and the power deliverer may maintain a lower voltage guard band.

The threshold and operation of the comparator 316 may be controlled by a comparator controller 318. The comparator controller 318, short controller 312 and long controller 310 may be control registers, and may allow for late adjustments of the current derivative threshold detection parameter as well as the actual time periods that the long and short moving averages are calculated over and based upon the reaction time of the power deliverer to allow the power deliverer sufficient time to increase the voltage output prior to a potential voltage droop. The comparator controller 318, the short controller 312 and the long controller 310 may be accessible to one or more of software, firmware or other hardware such that values of the comparator controller 318, the short controller 312 and the long controller 310 may be modified by a user or application to control the parameters.

Thus, the activity indicator 304, in some embodiments may be capable of predicting current derivative occurrences, in which current is rapidly increasing by subtracting the long moving average from the short moving average, and then comparing the result to a pre-established threshold value. In some embodiments, however to determine whether an estimation of the rate of change $$\frac{di}{dt}$$

is greater than the first amount, the short moving average may be subtracted from the long moving average. The comparator 316 may determine whether the difference between the long and short moving averages is less than or equal to a threshold value, and output the boost signal at a high value if so.

The activity indicator 304 may be adjusted to predict other types of current derivative events. For example, it may be possible to detect when the current of the baseline circuit is rapidly decreasing by reversing the subtraction operation or by using signed operators. Thus, the short moving average may be subtracted from the long moving average to determine a difference. If the difference is greater than or equal to a predetermined threshold value, then the activity indicator 304 may output the boost signal $V_{boost}$, or another signal, indicative that the baseline circuit is rapidly decreasing.

Figure 4:
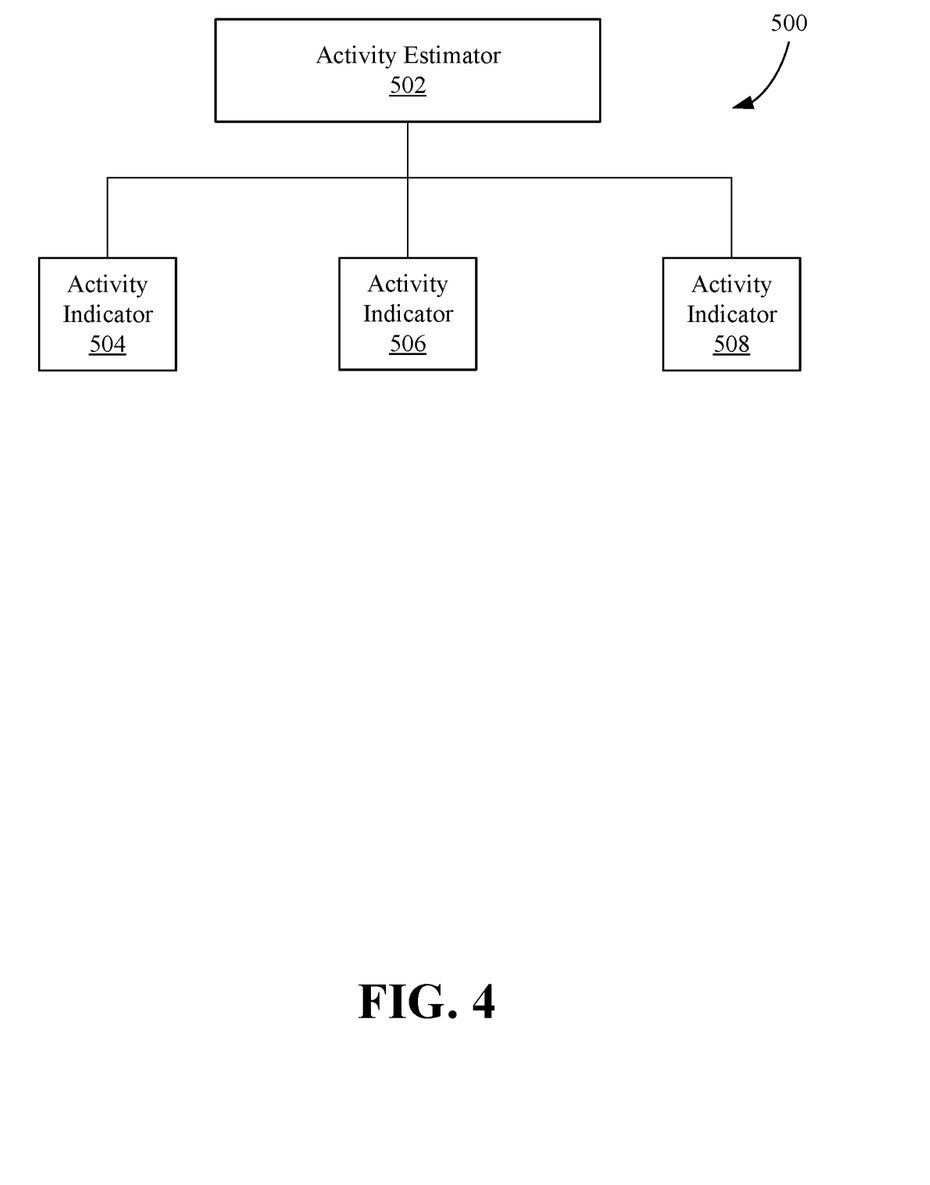

FIG. 4 illustrates a current derivative contention system 500. The current derivative contention system 500 includes an activity estimator 502 and activity indicators 504, 506, 508. The activity estimator 502 and activity indicators 504, 506, 508 may implement aspects of the activity indicator 110 and droop predictor 114. Each of the activity indicators 504, 506, 508 may be implemented similarly to the activity indicator 304.

In some embodiments, each of the activity indicators 504, 506, 508 may output different boost signals. For example, the activity indicator 504 may output a first boost signal to a power deliverer when the estimation of current derivative is greater than a first amount. The first boost signal may include an instruction to the power deliverer to increase a voltage output by a first value.

The activity indicator 506 may output a second boost signal to the power deliverer when the estimation of the current derivative is greater than or equal to a second amount, where the second amount is greater than the first amount. The second boost signal may include an instruction to the power deliverer to increase the voltage output by a second value greater than the first value. Therefore, the power deliverer may increase the voltage output of the power deliverer by different values, depending upon a magnitude of the estimation of the current derivative. In some embodiments, the first boost signal may be turned off when the second amount is reached by the estimation of the current derivative. In some embodiments, the activity indicators 504, 506 may simultaneously output both the first and second boost signals, and the power deliverer may modify a voltage output based upon the first and second boost signals to determine a voltage level increase of the power deliverer.

The activity indicator 508 may output a third signal. The third signal may be a third boost signal that is output when the estimation of the current derivative is equal to or greater than a third amount, and similarly to as described above. The third boost signal may include an instruction to increase the voltage output by the voltage deliverer by a third value, greater than the first and second values. In some embodiments, the activity indicator 508 may output a signal, indicative that the estimation of the current derivative is rapidly decreasing, to the power deliverer. The power deliverer may reduce a voltage output when the signal of the activity indicator 508 indicates that the estimation of the current derivative is rapidly decreasing.

Figure 5:
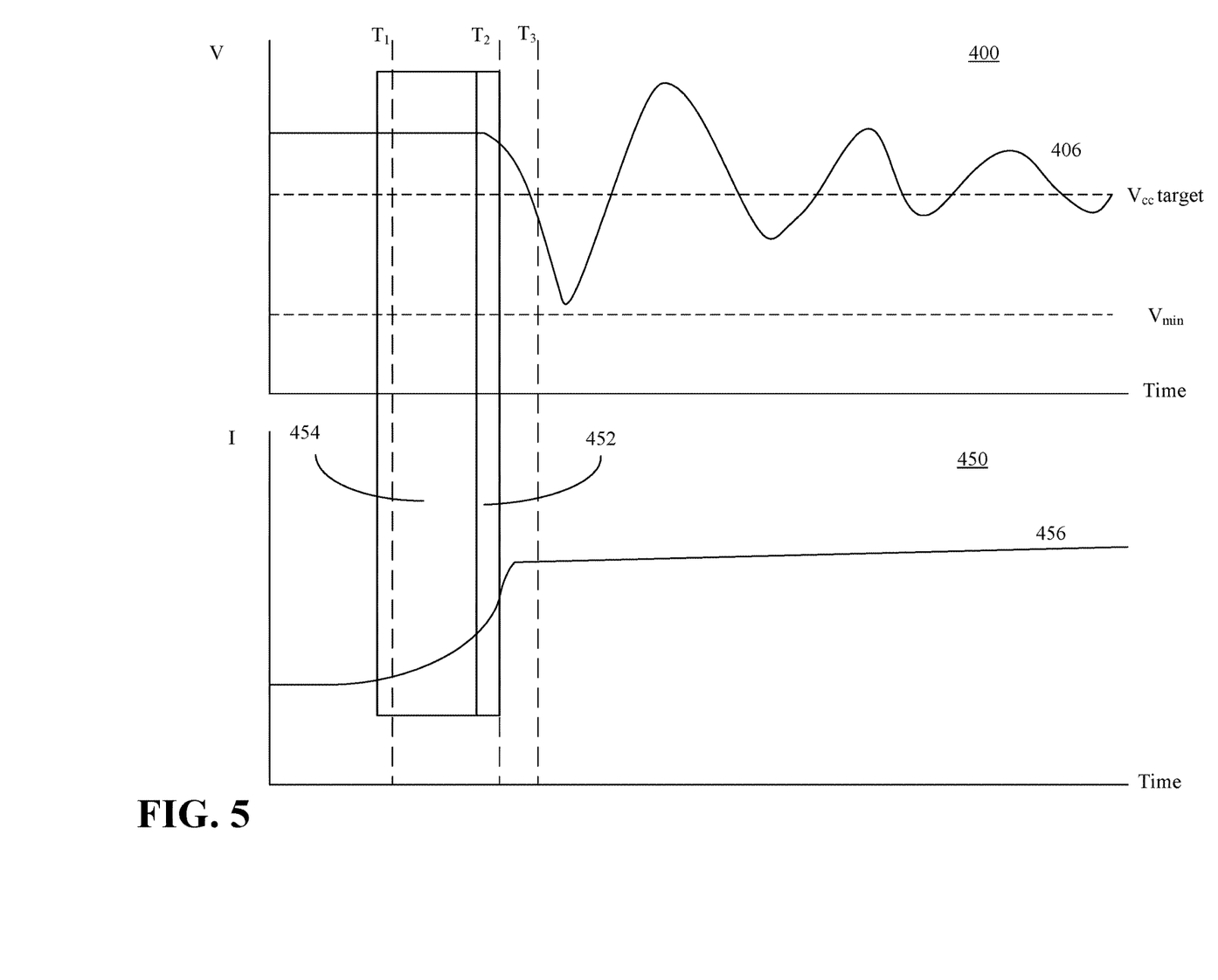
FIG. 5 is timing diagrams of examples of voltage, current and timing windows according to an embodiment.

FIG. 5 illustrates timing diagrams 400, 450 illustrating voltage output, current demand and long and short windows 452, 454. As illustrated by FIG. 5, a voltage output 406 of a power deliverer is illustrated by timing diagram 400, while a current demand 456 of a baseline circuit is illustrated by timing diagram 450. A current derivative contention system may determine long and short moving averages during long and short moving windows 452, 454, and output a boost signal based upon the long and short moving averages as described above.

As illustrated, as the current demand 456 increases, the voltage output 406 decreases. In some embodiments, it may be desirable to avoid having the voltage output 406 fall below $V_{min}$, otherwise the baseline circuit may malfunction and/or fail. Thus, a power deliverer (e.g., voltage regulator) that supports the ability to dynamically adjust the voltage output 406 within a certain range of operation may be controlled.

The reaction time to adjust voltage output 406 may be a consideration since a voltage adjustment may need to occur at the latest, during a "window of opportunity" to prevent and/or reduce a violation of a $V_{min}$. Therefore, the reaction time of the power deliverer to adjust the output voltage of the power deliverer may correspond to the length and time of the window of opportunity. The window of opportunity may be a region of time in which a reaction by the power deliverer may lead to a reduction in worst-case droop to avoid having voltage output 406 fall below $V_{min}$. For example, the window of opportunity may be a time required for the power deliverer to adjust the output voltage from a first level, to a second level greater than the first level when a voltage droop is predicted. The window of opportunity may also include the timing to provide the boost signal from the current derivative contention system to the power deliverer, and the timing for the power deliverer to react and begin adjust the voltage based upon the boost signal. The second level may be a safe voltage at which the voltage output will be unlikely to fall below $V_{min}$ due to a possible voltage droop. In FIG. 5, the window of opportunity may be defined as the time between $T_2$ to $T_3$. The current derivative contention system may set the short and long timing windows 452, 454 based upon the reaction time and the window of opportunity so that the short window 452 is shorter than the window of opportunity.

The long moving average determined during the long window 454 and the short moving average determined during the short window 452 may be calculated by long and short moving average counters as described above. The difference between the long and short moving averages may approximate the current derivative as described above, and be compared to a threshold value.

The estimation of the current derivative $$\frac{di}{dt}$$

may be determined from long and short moving averages determined during the short and long windows 452, 454. A boost signal from the current derivative contention system may be output when the estimation of the current derivative is determined to be above or equal to a predetermined amount. Therefore, in the window of opportunity from $T_2$-$T_3$ the boost signal may be output to the power deliverer to maintain voltage output 406 above $V_{min}$, and prior to the maximum droop occurring.

The length and timing of the long and short windows 452, 454 may be adjusted based upon electrical characteristics of the power deliverer, as well as worst-case scenario current derivative events (e.g., largest potential droop) that could be produced by the baseline circuit. For example, due to electrical characteristics (e.g., capacitors or inductors) of the power deliverer, sudden fluctuations on current draw may only translate into a voltage output decay visible to a closed-loop control system (e.g., the voltage regulator) after a certain amount of time. The time may be related to the unity gain bandwidth of the power deliverer or the unity gain frequency of the power deliverer. Such a timing may be referred to as minimum latency time period and may be the time between $T_1$ and $T_2$. The long window 454 may be a time period that is at least equal to the minimum latency time period. Thus, the long window 454 may have a time frame that is great enough to include activity of the baseline circuit for which current draw has been already observed in the closed-loop control system of the power deliverer. By doing so, the long moving average may include fluctuations on current draw which may be visible to the closed-loop control system, and enhance accuracy.

The short window 452 may be short enough to only include relatively recent activity for which current draw has not been fully observed or detected by the closed-loop control system of the power deliverer. The short moving average may represent a voltage droop "liability" that has not yet been comprehended by the closed-loop control system.

The short window 452 may be set to a timing sufficiently short to allow the power deliverer to respond to a boost signal within the window of opportunity. For example, the short window 452 may be shorter than the reaction time of the voltage deliverer to adjust a voltage output, but sufficiently long to provide an accurate assessment of possible current usage. The short window 452 may be set to be shorter than the minimum latency time period.

If the baseline circuit supports Dynamic Voltage-Frequency Scaling (DVFS), the long and short windows 452, 454 of the long and short moving averages may be adjusted depending on the frequency of operation and the baseline target voltage used. Furthermore, while the long and short windows 452, 454 overlap in FIG. 5, in some embodiments the long and short moving windows 452, 454 may not overlap.

The long and short windows 452, 454 may be provided in absolute real-time time. Thus, if the frequency and/or the clock cycles in the digital domain of the current derivative contention system is modified, the current derivative contention system may be readjusted to modify the number of clock cycles over which the long and short moving averages are calculated, so as to maintain the long and short windows 452, 454 to be accurate in absolute time.

Figure 6:
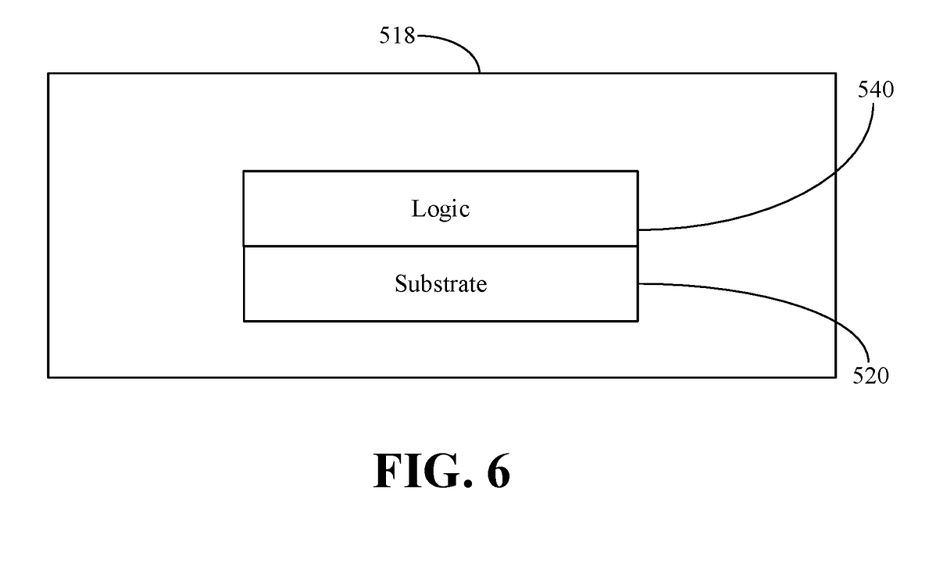
FIG. 6 is an illustration of an example of a semiconductor package apparatus according to an embodiment.

FIG. 6 illustrates semiconductor package apparatus 518. The semiconductor package apparatus 518 may implement one or more aspects of the methods 200 (FIG. 2) and may be readily substituted for the activity indicator 110, reactor 106, droop predictor 114 and power controller 104 (FIG. 1), activity estimator 302 and activity indicator 304 (FIG. 3), and activity estimator 502 and activity indicators 504, 506, 508. The illustrated apparatus 518 includes one or more substrates 520 (e.g., silicon, sapphire, gallium arsenide) and logic 540 (e.g., transistor array and other integrated circuit/IC components) coupled to the substrate(s) 104. The logic 540 may be implemented at least partly in configurable logic or fixed-functionality logic hardware. In one example, the logic 540 includes transistor channel regions that are positioned (e.g., embedded) within the substrate(s) 520. Thus, the interface between the logic 540 and the substrate(s) 520 may not be an abrupt junction. The logic 540 may also be considered to include an epitaxial layer that is grown on an initial wafer of the substrate(s) 520. While one substrate 520 is illustrated, more than one substrate may be included.

Additional Notes and Examples

Example 1 may include a voltage regulated computing system, comprising a load to provide indicator data associated with activity of the load, a voltage regulator to provide an output voltage to the load, and logic, implemented at least partly in one or more of configurable logic or fixed-functionality logic hardware, to receive the indicator data, determine, from the indicator data, an estimation of a rate of change of a current of the load with respect to time, and selectively output a boost signal to the voltage regulator when the estimation is greater than a first amount, wherein the boost signal is to be associated with an adjustment in the output voltage.

Example 2 may include the system of example 1, wherein the logic is to include a short moving average counter to determine a short average of the activity of the load for a first time period based on the indicator data, and a long moving average counter to determine, based on the indicator data, a long average of the activity of the load for a second time period longer than the first time period, and wherein the logic is to determine the estimation of the rate of change from the long average and the short average.

Example 3 may include the system of example 2, wherein the logic is to determine the estimation of the rate of change from a difference between the long average and the short average.

Example 4 may include the system of example 2, wherein the second time period is at least as long as a timing to detect a voltage output decay of the output voltage by the voltage regulator.

Example 5 may include the system of any one of examples 1-4, wherein the boost signal is to include a command to instruct the voltage regulator to increase the output voltage.

Example 6 may include the system of example 5, wherein when the estimation of the rate of change is between the first amount and a second amount greater than the first amount, the command is to instruct the voltage regulator to increase the output voltage by a first value, and when the estimation of the rate of change is greater than or equal to the second amount, the command is to instruct the voltage regulator to increase the output voltage by a second value greater than the first value.

Example 7 may include a voltage control apparatus, comprising one or more substrates, and logic coupled to the one or more substrates and implemented at least partly in one or more of configurable logic or fixed-functionality logic hardware, the logic to receive indicator data associated with activity of a load, determine, from the indicator data, an estimation of a rate of change of a current of the load with respect to time, and selectively output a boost signal to a voltage regulator when the estimation of the rate of change is greater than a first amount, wherein the boost signal is to be associated with an adjustment of an output voltage of the voltage regulator and the output voltage is to be provided to the load.

Example 8 may include the apparatus of example 7, wherein the logic is to include a short moving average counter to determine a short average of the activity of the load for a first time period based on the indicator data, and a long moving average counter to determine, based on the indicator data, a long average of the activity of the load for a second time period longer than the first time period, wherein the logic is to determine the estimation from the long average and the short average.

Example 9 may include the apparatus of example 8, wherein the logic is to determine the estimation of the rate of change from a difference between the long average and the short average.

Example 10 may include the apparatus of example 8, wherein the second time period is at least as long as a timing to detect a decay of the output voltage by the voltage regulator.

Example 11 may include the apparatus of any one of examples 7-10, wherein the boost signal is to include a command to instruct the voltage regulator to increase the output voltage.

Example 12 may include the apparatus of example 11, wherein when the estimation of the rate of change is between the first amount and a second amount greater than the first amount, the command is to instruct the voltage regulator to increase the output voltage by a first value, and when the estimation of the rate of change is greater than or equal to the second amount, the command is to instruct the voltage regulator to increase the output voltage by a second value greater than the first value.

Example 13 may include the apparatus of example 7, wherein the logic coupled to the one or more substrates includes transistor channel regions that are positioned within the one or more substrates.

Example 14 may include a voltage regulation method, comprising receiving indicator data associated with activity of a load, determining, from the indicator data, an estimation of a rate of change of a current of the load with respect to time, and selectively outputting a boost signal to a voltage regulator when the estimation of the rate of change is greater than a first amount, wherein the boost signal is associated with an adjustment of an output voltage of the voltage regulator and the output voltage is provided to the load.

Example 15 may include the method of example 14, further comprising determining a short average of the activity of the load for a first time period based on the indicator data, and determining, based on the indicator data, a long average of the activity of the load for a second time period longer than the first time period, and wherein the estimation of the rate of change is determined based on the long average and the short average.

Example 16 may include the method of example 15, wherein the determining the estimation of the rate of change includes determining a difference between the long average and the short average.

Example 17 may include the method of example 15, wherein the second time period is at least as long as a timing to detect a decay of the output voltage by the voltage regulator.

Example 18 may include the method of any one of examples 14-17, wherein the boost signal includes a command to instruct the voltage regulator to increase the output voltage.

Example 19 may include the method of example 18, wherein when the estimation of the rate of change is between the first amount and a second amount greater than the first amount, the command is to instruct the voltage regulator to increase the output voltage by a first value, and when the estimation of the rate of change is greater than or equal to the second amount, the command is to instruct the voltage regulator to increase the output voltage by a second value greater than the first value.

Example 20 may include at least one computer readable storage medium comprising a set of commands, which when executed by a computing system, cause the computing system to receive indicator data associated with activity of a load, determine, from the indicator data, an estimation of a rate of change of a current of the load with respect to time, and selectively output a boost signal to a voltage regulator when the estimation of the rate of change is greater than a first amount, wherein the boost signal is to be associated with an adjustment of an output voltage of the voltage regulator and the output voltage is to be provided to the load.

Example 21 may include the at least one computer readable storage medium of example 20, wherein the commands, when executed, cause a computing system to determine a short average of the activity of the load for a first time period based on the indicator data, and determine, based on the indicator data, a long average of the activity of the load for a second time period longer than the first time period, and wherein the determine the estimation of the rate of change is based on the long average and the short average.

Example 22 may include the at least one computer readable storage medium of example 21, wherein the commands, when executed, cause a computing system to determine the estimation of the rate of change from a difference between the long average and the short average.

Example 23 may include the at least one computer readable storage medium of example 21, wherein the second time period is at least as long as a timing to detect a decay of the output voltage by the voltage regulator.

Example 24 may include the at least one computer readable storage medium of any of examples 20-23, wherein the boost signal includes a boost command to instruct the voltage regulator to increase the output voltage.

Example 25 may include the at least one computer readable storage medium of example 24, wherein when the estimation of the rate of change is between the first amount and a second amount greater than the first amount, the boost command is to instruct the voltage regulator to increase the output voltage by a first value, and when the estimation of the rate of change is greater than or equal to the second amount, the boost command is to instruct the voltage regulator to increase the output voltage by a second value greater than the first value.

Example 26 may include a power control apparatus, comprising means for receiving indicator data associated with activity of a load, means for determining, from the indicator data, an estimation of a rate of change of a current of the load with respect to time, and means for selectively outputting a boost signal to a voltage regulator when the estimation of the rate of change is greater than a first amount, wherein the boost signal is associated with an adjustment of an output voltage of the voltage regulator and the output voltage is provided to the load.

Example 27 may include the apparatus of example 26, further comprising means for determining a short average of the activity of the load for a first time period based on the indicator data, and means for determining, based on the indicator data, a long average of the activity of the load for a second time period longer than the first time period, and wherein the estimation of the rate of change is determined based on the long average and the short average.

Example 28 may include the apparatus of example 27, wherein the means for determining the estimation of the rate of change includes means for determining a difference between the long average and the short average.

Example 29 may include the apparatus of example 27, wherein the second time period is at least as long as a timing to detect a decay of the output voltage by the voltage regulator.

Example 30 may include the apparatus of any one of examples 26-29, wherein the boost signal includes a command to instruct the voltage regulator to increase the output voltage.

Example 31 may include the apparatus of example 30, wherein when the estimation of the rate of change is between the first amount and a second amount greater than the first amount, the command is to instruct the voltage regulator to increase the output voltage by a first value, and when the estimation of the rate of change is greater than or equal to the second amount, the command is to instruct the voltage regulator to increase the output voltage by a second value greater than the first value.

Techniques described herein may therefore solve problems associated with power consumption of computing systems, and in particular system-on-chips. Techniques described herein may enhance power efficiency by minimizing power consumption when no voltage droops are predicted, and increasing power consumption when voltage droops are predicted.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Moreover, the term "plurality" with respect to a particular item may not necessarily refer to all items present in a given solution and may rather simply be considered two or more items. Similarly, the term "each" in reference to a plurality of items may not necessarily refer to all items in a given solution and may rather simply be considered one or more items.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system, comprising:
   a load to provide indicator data associated with activity of the load;
   a voltage regulator to provide an output voltage to the load; and
   logic, implemented at least partly in one or more of configurable logic or fixed-functionality logic hardware, to:
   receive the indicator data;
   determine a short average of the activity of the load for a first time period based on the indicator data, wherein the short average is to correspond to an average current usage of the load for the first time period;
   determine, based on the indicator data, a long average of the activity of the load for a second time period longer than the first time period, wherein the long average is to correspond to an average current usage of the load for the second time period;
   determine an estimation of a rate of change of a current of the load with respect to time based on a difference between the long average and the short average; and
   selectively output a boost signal to the voltage regulator when the estimation is greater than a first amount, wherein the boost signal is to be associated with an adjustment in the output voltage.

2. The system of claim 1, wherein the logic is to include:
   a short moving average counter to determine the short average, and
   a long moving average counter to determine the long average,
   wherein the first time period overlaps the second time period.

3. The system of claim 1, wherein the second time period is at least as long as a timing to detect a voltage output decay of the output voltage by the voltage regulator.

4. The system of claim 1, wherein the boost signal is to include a command to instruct the voltage regulator to increase the output voltage.

5. The system of claim 4, wherein:
   when the estimation of the rate of change is between the first amount and a second amount greater than the first amount, the command is to instruct the voltage regulator to increase the output voltage by a first value, and
   when the estimation of the rate of change is greater than or equal to the second amount, the command is to instruct the voltage regulator to increase the output voltage by a second value greater than the first value.

6. An apparatus, comprising:
   one or more substrates; and
   logic coupled to the one or more substrates and implemented at least partly in one or more of configurable logic or fixed-functionality logic hardware, the logic to:
   receive indicator data associated with activity of a load;
   determine a short average of the activity of the load for a first time period based on the indicator data, wherein the short average is to correspond to an average current usage of the load for the first time period;

determine, based on the indicator data, a long average of the activity of the load for a second time period longer than the first time period, wherein the long average is to correspond to an average current usage of the load for the second time period;

determine an estimation of a rate of change of a current of the load with respect to time based on a difference between the long average and the short average; and selectively output a boost signal to a voltage regulator when the estimation of the rate of change is greater than a first amount, wherein the boost signal is to be associated with an adjustment of an output voltage of the voltage regulator and the output voltage is to be provided to the load.

7. The apparatus of claim 6, wherein the logic is to include:

a short moving average counter to determine the short average; and a long moving average counter to determine the long average, wherein the first time period overlaps the second time period.

8. The apparatus of claim 6, wherein the second time period is at least as long as a timing to detect a decay of the output voltage by the voltage regulator.

9. The apparatus of claim 6, wherein the boost signal is to include a command to instruct the voltage regulator to increase the output voltage.

10. The apparatus of claim 9, wherein:

when the estimation of the rate of change is between the first amount and a second amount greater than the first amount, the command is to instruct the voltage regulator to increase the output voltage by a first value, and when the estimation of the rate of change is greater than or equal to the second amount, the command is to instruct the voltage regulator to increase the output voltage by a second value greater than the first value.

11. The apparatus of claim 6, wherein the logic coupled to the one or more substrates includes transistor channel regions that are positioned within the one or more substrates.

12. A method, comprising:

receiving indicator data associated with activity of a load;

determining a short average of the activity of the load for a first time period based on the indicator data, wherein the short average is to correspond to an average current usage of the load for the first time period;

determining, based on the indicator data, a long average of the activity of the load for a second time period longer than the first time period, wherein the long average is to correspond to an average current usage of the load for the second time period;

determining an estimation of a rate of change of a current of the load with respect to time based on a difference between the long average and the short average; and selectively outputting a boost signal to a voltage regulator when the estimation of the rate of change is greater than a first amount, wherein the boost signal is associated with an adjustment of an output voltage of the voltage regulator and the output voltage is provided to the load.

13. The method of claim 12, wherein the first time period overlaps the second time period.

14. The method of claim 12, wherein the second time period is at least as long as a timing to detect a decay of the output voltage by the voltage regulator.

15. The method of claim 12, wherein the boost signal includes a command to instruct the voltage regulator to increase the output voltage.

16. The method of claim 15, wherein:

when the estimation of the rate of change is between the first amount and a second amount greater than the first amount, the command is to instruct the voltage regulator to increase the output voltage by a first value, and when the estimation of the rate of change is greater than or equal to the second amount, the command is to instruct the voltage regulator to increase the output voltage by a second value greater than the first value.

17. At least one non-transitory computer readable storage medium comprising a set of commands, which when executed by a computing system, cause the computing system to:

receive indicator data associated with activity of a load;

determine a short average of the activity of the load for a first time period based on the indicator data, wherein the short average is to correspond to an average current usage of the load for the first time period;

determine, based on the indicator data, a long average of the activity of the load for a second time period longer than the first time period, wherein the long average is to correspond to an average current usage of the load for the second time period;

determine an estimation of a rate of change of a current of the load with respect to time based on a difference between the long average and the short average; and selectively output a boost signal to a voltage regulator when the estimation of the rate of change is greater than a first amount, wherein the boost signal is to be associated with an adjustment of an output voltage of the voltage regulator and the output voltage is to be provided to the load.

18. The at least one non-transitory computer readable storage medium of claim 17, wherein the first time period overlaps the second time period.

19. The at least one non-transitory computer readable storage medium of claim 17, wherein the second time period is at least as long as a timing to detect a decay of the output voltage by the voltage regulator.

20. The at least one non-transitory computer readable storage medium of claim 17, wherein the boost signal includes a boost command to instruct the voltage regulator to increase the output voltage.

21. The at least one non-transitory computer readable storage medium of claim 20, wherein when the estimation of the rate of change is between the first amount and a second amount greater than the first amount, the boost command is to instruct the voltage regulator to increase the output voltage by a first value, and when the estimation of the rate of change is greater than or equal to the second amount, the boost command is to instruct the voltage regulator to increase the output voltage by a second value greater than the first value.

* * * * *